(12) United States Patent
Meir et al.

(10) Patent No.: US 9,170,885 B2
(45) Date of Patent: Oct. 27, 2015

(54) INDEPENDENT MANAGEMENT OF DATA AND PARITY LOGICAL BLOCK ADDRESSES

(71) Applicant: Apple Inc., Cupertino, CA (US)

(72) Inventors: Avraham Poza Meir, Herzeliya (IL); Oren Golov, Hod-Hasharon (IL); Naftali Sommer, Rishon Le-Zion (IL); Moshe Neerman, Herzeliya (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/468,527

(22) Filed: Aug. 26, 2014

(65) Prior Publication Data

US 2014/0365821 A1 Dec. 11, 2014

Related U.S. Application Data

(63) Continuation of application No. 13/419,452, filed on Mar. 14, 2012, now Pat. No. 8,850,104.

(60) Provisional application No. 61/454,584, filed on Mar. 21, 2011.

(51) Int. Cl.
G06F 11/10 (2006.01)
G06F 12/06 (2006.01)
G06F 12/02 (2006.01)
G06F 3/06 (2006.01)

(52) U.S. Cl.
CPC .............. *G06F 11/108* (2013.01); *G06F 3/064* (2013.01); *G06F 3/0616* (2013.01); *G06F 3/0688* (2013.01); *G06F 11/10* (2013.01); *G06F 11/1068* (2013.01); *G06F 11/1096* (2013.01); *G06F 12/0246* (2013.01); *G06F 12/06* (2013.01); *G06F 2211/1059* (2013.01); *G06F 2212/7205* (2013.01)

(58) Field of Classification Search
CPC ..... G06F 11/10; G06F 11/0246; G06F 12/06; G06F 2212/7205
USPC ........................................................ 711/103
See application file for complete search history.

(56) References Cited

U.S. PATENT DOCUMENTS

| 2009/0083482 A1* | 3/2009 | Price et al. ..................... 711/114 |
| 2009/0172258 A1* | 7/2009 | Olbrich et al. ................ 711/103 |
| 2009/0172335 A1* | 7/2009 | Kulkarni et al. .............. 711/170 |
| 2011/0161406 A1* | 6/2011 | Kakeda et al. ................ 709/203 |
| 2012/0079318 A1* | 3/2012 | Colgrove et al. ............. 714/6.22 |
| 2013/0073901 A1* | 3/2013 | Syrgabekov et al. ........ 714/6.24 |

* cited by examiner

*Primary Examiner* — Ryan Bertram
(74) *Attorney, Agent, or Firm* — Meyertons, Hood, Kivlin, Kowert & Goetzel, P.C.

(57) ABSTRACT

A data storage method includes identifying, in a set of data items associated with respective logical addresses for storage in a memory, a first subset of the logical addresses associated with the data items containing application data, and a second subset of the logical addresses associated with the data items containing parity information that has been calculated over the application data. The data items associated with the first identified subset are stored in one or more first physical memory areas of the memory, and the data items associated with the second identified subset are stored in one or more second physical memory areas of the memory, different from the first physical memory areas. A memory management task is performed independently in the first physical memory areas and in the second physical memory areas.

18 Claims, 3 Drawing Sheets

INDEPENDENT MANAGEMENT OF DATA AND PARITY LOGICAL BLOCK ADDRESSES

CROSS-REFERENCE TO RELATED APPLICATIONS

This application is a continuation if U.S. patent application Ser. No. 13/419,452, filed Mar. 14, 2012, which claims the benefit of U.S. Provisional Patent Application 61/454,584, filed Mar. 21, 2011, whose disclosure is incorporated herein by reference.

FIELD OF THE INVENTION

Embodiments described herein are related to the field of data storage, and particularly to methods and systems for managing data storage in non-volatile memory.

BACKGROUND OF THE INVENTION

Some data storage systems use redundant storage techniques for protecting data stored in memory against failures. A well-established family of redundant storage techniques is known as Redundant Array of Inexpensive Disks (RAID). For example, U.S. Patent Application Publication 2010/0017650, whose disclosure is incorporated herein by reference, describes a non-volatile memory data storage system, which includes a host interface for communicating with an external host, and a main storage including a first plurality of Flash memory devices. Each memory device includes a second plurality of memory blocks. A third plurality of first stage controllers are coupled to the first plurality of Flash memory devices. A second stage controller is coupled to the host interface and the third plurality of first stage controller through an internal interface. The second stage controller is configured to perform RAID operation for data recovery according to at least one parity.

As another example, U.S. Patent Application Publication 2009/0204872, whose disclosure is incorporated herein by reference, describes a Flash module having raw-NAND Flash memory chips accessed over a Physical-Block Address (PBA) bus by a controller. The controller converts logical block addresses to physical block addresses. In some embodiments, data can be arranged to provide redundant storage, which is similar to a RAID system, in order to improve system reliability.

SUMMARY OF THE INVENTION

An embodiment of the present invention that is described herein provides a data storage method. The method includes identifying, in a set of data items associated with respective logical addresses for storage in a memory, a first subset of the logical addresses associated with the data items containing application data, and a second subset of the logical addresses associated with the data items containing parity information that has been calculated over the application data. The data items associated with the first identified subset are stored in one or more first physical memory areas of the memory, and the data items associated with the second identified subset are stored in one or more second physical memory areas of the memory, different from the first physical memory areas. A memory management task is performed independently in the first physical memory areas and in the second physical memory areas.

In an embodiment, performing the memory management task includes assigning a first over-provisioning overhead to the first physical memory areas, and assigning a second over-provisioning overhead, different from the first over-provisioning overhead, to the second physical memory areas. In another embodiment, performing the memory management task includes performing memory compaction in the first physical memory areas, and performing the memory compaction in the second physical memory areas independently of the first physical memory areas. In yet another embodiment, performing the memory management task includes performing static wear leveling in the first physical memory areas, and performing the static wear leveling in the second physical memory areas independently of the first physical memory areas.

In some embodiments, the method includes accepting the set of the data items and the respective logical addresses from a host. Identifying the first and second subsets may include identifying one or more parameters of a redundant storage scheme used by the host to produce the data items containing the parity information, and identifying the first and second subsets based on the parameters. In an embodiment, identifying the parameters includes receiving the parameters from the host. In another embodiment, identifying the parameters includes extracting the parameters from a data structure stored in the memory.

In still another embodiment, identifying the parameters includes assessing a statistical distribution of the logical addresses and deducing the parameters from the assessed statistical distribution. Assessing the statistical distribution may include performing multiple modulo operations of the logical addresses. In an embodiment, deducing the parameters includes executing an acquisition process that identifies the parameters, and subsequently executing a tracking process that verifies that the statistical distribution of subsequent accepted logical addresses matches the identified parameters.

In some embodiments, the method includes, in a memory controller, accepting the application data from a host and calculating the parity information over the application data accepted from the host. In an embodiment, the method includes, in the memory controller, calculating first internal parity items over the data items in the first identified subset, calculating second internal parity items over the data items in the second identified subset, storing the first and second internal parity items respectively in third and fourth physical memory areas in the memory, such that the first, second, third and fourth physical memory areas are different from one another, and performing the memory management task independently in the first, second, third and fourth physical memory areas.

There is additionally provided, in accordance with an embodiment of the present invention, a data storage apparatus including an interface and a processor. The interface is configured to accept from a host at least application data for storage in a memory. The processor is configured to identify, in a set of data items associated with respective logical addresses for storage in the memory, a first subset of the logical addresses associated with the data items containing the application data, to identify in the set a second subset of the logical addresses associated with the data items containing parity information that has been calculated over the application data, to store the data items associated with the first identified subset in first physical memory areas of the memory, to store the data items associated with the second identified subset in second physical memory areas of the memory, different from the first physical memory areas, and to perform a memory management task independently in the first physical memory areas and in the second physical memory areas.

There is also provided, in accordance with an embodiment of the present invention, a data storage apparatus including a memory and a processor. The processor is configured to accept from a host at least application data for storage in the memory, to identify, in a set of data items associated with respective logical addresses for storage in the memory, a first subset of the logical addresses associated with the data items containing the application data, to identify in the set a second subset of the logical addresses associated with the data items containing parity information that has been calculated over the application data, to store the data items associated with the first identified subset in first physical memory areas of the memory, to store the data items associated with the second identified subset in second physical memory areas of the memory, different from the first physical memory areas, and to perform a memory management task independently in the first physical memory areas and in the second physical memory areas.

There is further provided, in accordance with an embodiment of the present invention, a method for data storage. The method includes calculating in a host processor parity information over application data in accordance with a redundant storage scheme. Data items associated with respective logical addresses, including first data items including the application data and second data items including the parity information, are sent from the host processor to a storage device for storage in the storage device. The host processor provides to the storage device one or more parameters of the redundant storage scheme, so as to enable the storage device to perform memory management tasks independently on the first data items and on the second data items.

In an embodiment, the storage device includes a Solid State Drive (SSD). In an embodiment, providing the parameters of the redundant storage scheme includes sending the parameters to the storage device over the same interface used for sending the data items, over a sideband interface different from the interface used for sending the data items, or over an implicit interface formed by coordinating between the host processor and the storage device ranges of the logical addresses for the first and second data items.

There is additionally provided, in accordance with an embodiment of the present invention, a data storage apparatus including an interface and a host processor. The interface is configured to communicate with a storage device. The host processor is configured to calculate parity information over application data in accordance with a redundant storage scheme, to send to the storage device over the interface data items associated with respective logical addresses for storage in the storage device, including first data items including the application data and second data items including the parity information, and to provide to the storage device one or more parameters of the redundant storage scheme so as to enable the storage device to perform memory management tasks independently on the first data items and on the second data items.

The present invention will be more fully understood from the following detailed description of the embodiments thereof, taken together with the drawings in which:

DETAILED DESCRIPTION OF EMBODIMENTS

Overview

Figure 1:
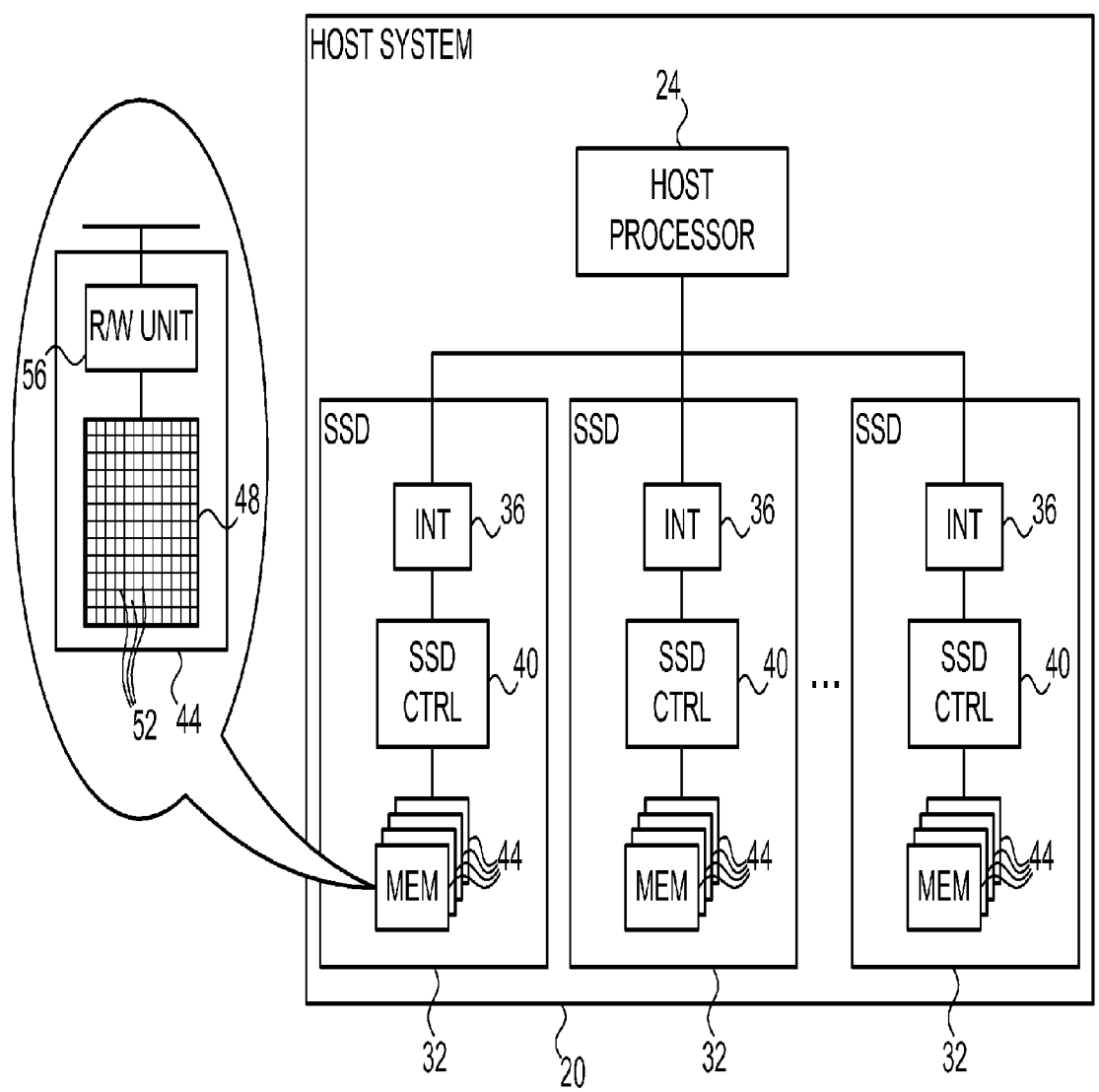
FIG. 1 is a block diagram that schematically illustrates a host system, in accordance with an embodiment of the present invention.

A typical Flash memory is divided into multiple memory blocks, each block comprising multiple memory pages. Data is written and read in page units, but erased in block units (also referred to as physical blocks or erasure blocks). Moreover, data cannot be written in-place, i.e., a new page cannot be overwritten over an old page in the same physical storage location unless the entire block is erased first. Furthermore, Flash memory has limited endurance, i.e., it is able to endure only a limited number of programming and erasure cycles.

Because of these characteristics, data storage in Flash memory typically involves complex management functions including, for example, logical-physical address mapping, block compaction ("garbage collection") and block wear leveling. These management functions are often referred to collectively as "Flash management" or Flash Translation Layer (FTL).

In some applications, a host or a memory controller applies a redundant storage scheme, such as RAID, to data before sending the data for storage in the non-volatile memory. Typically, the host or the memory controller calculates parity information over the data, and then sends both the data and the parity information for storage. In most redundant storage schemes, the access statistics of the parity information differ from the access statistics of the data. For example, since the parity information is updated upon any update of data, write operations of parity information are much more frequent than write operations of data.

Embodiments of the present invention that are described herein provide improved methods and systems for managing data storage in non-volatile memory, such as Flash memory. In contrast to conventional RAID models, the disclosed techniques store application data (also referred to as user data) and parity information separately from one another in the memory blocks of the memory, and perform memory management functions independently on the blocks containing application data and the blocks containing parity information.

In some embodiments, a memory controller stores data items in a non-volatile memory on behalf of a host. The data items received from the host are associated with respective logical addresses (e.g., Logical Block Addresses—LBAs). The memory controller identifies which logical addresses correspond to data items containing application data, and which logical addresses correspond to data items containing parity information. Using this distinction, the memory controller stores the data items containing application data and the data items containing parity information in different physical memory areas, e.g., in different sets of physical blocks. The memory controller performs memory management functions, such as block compaction or static wear leveling, independently on the physical memory areas containing the application data and on the physical memory areas containing the parity information.

In alternative embodiments, the memory controller accepts the application data from the host and applies the redundant storage scheme internally, i.e., calculates the parity information internally over the application data. In other embodiments, the host applies a certain redundant storage scheme (referred to as an external redundant storage scheme), and the memory controller applies a separate redundant storage scheme (referred to as an external redundant storage scheme). The combination of the two redundant storage schemes produces four different types of data items, which are stored in separate physical areas and managed separately.

Allocating dedicated physical areas for the parity information yields a higher amount of invalid data ("garbage") in those blocks, since the parity information is written more frequently (compared to a scheme that mixes application data and parity information in the same memory areas and therefore the garbage is distributed homogeneously in the memory).

The independent management of application data and parity information increases the efficiency of the memory management functions and improves the performance of the memory, because of the different access statistics of the application data and parity information. For example, performing block compaction ("garbage collection") independently reduces the number of unnecessary copy operations. Independent wear leveling becomes more efficient since the data items in each physical block are more balanced in terms of wear level.

In some embodiments, the memory controller identifies the logical addresses corresponding to parity information autonomously, irrespective of cooperation or prior information from the host. Example methods for such autonomous identification are described herein.

System Description

FIG. 1 is a block diagram that schematically illustrates a host system 20, in accordance with an embodiment of the present invention. Host system 20 comprises a host processor 24 and one or more non-volatile storage devices, in the present example Solid-State Disks (SSDs) 32. Host system 20 may comprise, for example, an enterprise storage system comprising multiple SSDs 32, a computing device such as a notebook or laptop computer, or any other suitable host system. The example of FIG. 1 shows an enterprise system comprising three SSDs 32 for the sake of clarity. Generally, system 20 may comprise any desired number of (one or more) non-volatile storage devices, e.g., SSDs or other storage device.

Host processor 24 communicates with the non-volatile storage devices over a suitable interface (not shown in the figure). Each SSD 32 comprises a host interface 36 for communicating with host processor 24, an SSD controller 40, and one or more non-volatile memory devices 44. Each memory device 44 comprises an array 48 of multiple memory blocks 52. Memory blocks 52 are also referred to as erasure blocks, physical memory blocks or simply blocks for brevity. A Read/Write (R/W) unit 56 writes data into memory blocks 52, and retrieves data from the memory blocks.

Some or all of the functions of SSD controller 40 may be implemented in hardware. Alternatively, SSD controller 40 may comprise a microprocessor that runs suitable software, or a combination of hardware and software elements. In some embodiments, SSD controller 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The configuration of FIG. 1 is an exemplary system configuration, which is shown purely for the sake of conceptual clarity. Any other suitable memory system configuration can also be used. Elements that are not necessary for understanding the principles of the present invention have been omitted from the figure for clarity.

In the example system configuration shown in FIG. 1, memory devices 44 and SSD controller 40 are implemented as two separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD circuitry may reside on the same die on which one or more of the memory devices are disposed. Further alternatively, some or all of the functionality of SSD controller 40 can be implemented in software and carried out by host processor 24. In some embodiments, host processor 24 and SSD controller 40 may be fabricated on the same die, or on separate dies in the same device package.

Typically, host processor 24 reads and writes data in SSD 32 by specifying logical addresses of the data (e.g., using Logical Block Addressing—LBA). SSD controller 40 translates the logical addresses into respective physical storage locations in memory devices 44.

Independent Memory Management for Data and Parity LBA'S for Redundant Storage Scheme Applied by Host In some embodiments, host processor 24 sends application data (also referred to as user data or simply data for brevity) to SSDs 32 for storage. The host processor applies a redundant storage scheme to the application data before sending it to SSDs 32. When applying the redundant storage scheme, the host processor typically calculates parity information over the application data. Thus, the host processor sends to SSDs 32 data items, some of which contain application data and some of which contain parity information. The host processor may apply any suitable redundant storage scheme that generates parity information, such as a RAID scheme that is applied among multiple SSDs or a RAID scheme that is applied among multiple memory devices 44 in a given SSD.

Typically, host processor 24 sends each data item with an associated logical address, e.g., Logical Block Address (LBA). SSD controller 40 translates the logical addresses to respective physical storage locations in memory devices 44, and stores the data items in the appropriate physical storage locations.

In practice, the access statistics of the data items containing application data often differs from the access statistics of the data items containing parity information. In RAID 5, for example, every update of a random LBA data item containing application data causes an update of a data item containing parity information. In other words, 50% of the write operations are performed on data items containing application data, and the other 50% are performed on data items containing parity information. Since the number of data items containing parity information is typically much smaller than the number of data items containing application data, the data items containing parity are updated much more frequently than the data items containing application data.

As another example, in RAID 6 each update of a data item containing application data causes updates of two data items containing parity information. In other words, only ⅓ of the write operations are performed on data items containing application data, and ⅔ are performed on data items containing parity information. Again, the data items containing parity are updated much more frequently than the data items containing application data.

Because of the different access statistics, mixing application data and parity information in the same physical blocks reduces the efficiency of the memory management functions and degrades the performance of SSD 32. Thus, in some embodiments, SSD controller 40 identifies which logical addresses correspond to data items containing application data and which correspond to data items containing parity information. The SSD controller configures the logical-to-physical address mapping, such that data items containing application data are stored in a first subset of physical blocks 52, and data items containing parity information are stored in a second subset of physical blocks 52, different from the first subset.

The SSD controller carries out memory management functions, such as compaction and wear-leveling, independently in the first subset and in the second subset of physical blocks. The memory management functions are also referred to as Flash management of Flash Translation Layer (FTL) functions. The term "independently" means that the SSD controller performs memory management functions on the blocks in the first subset (the blocks associated with the data items containing application data) irrespective of memory managements functions that are performed on the blocks in the second subset (the blocks associated with the data items containing parity information), and vice versa.

Figure 2:
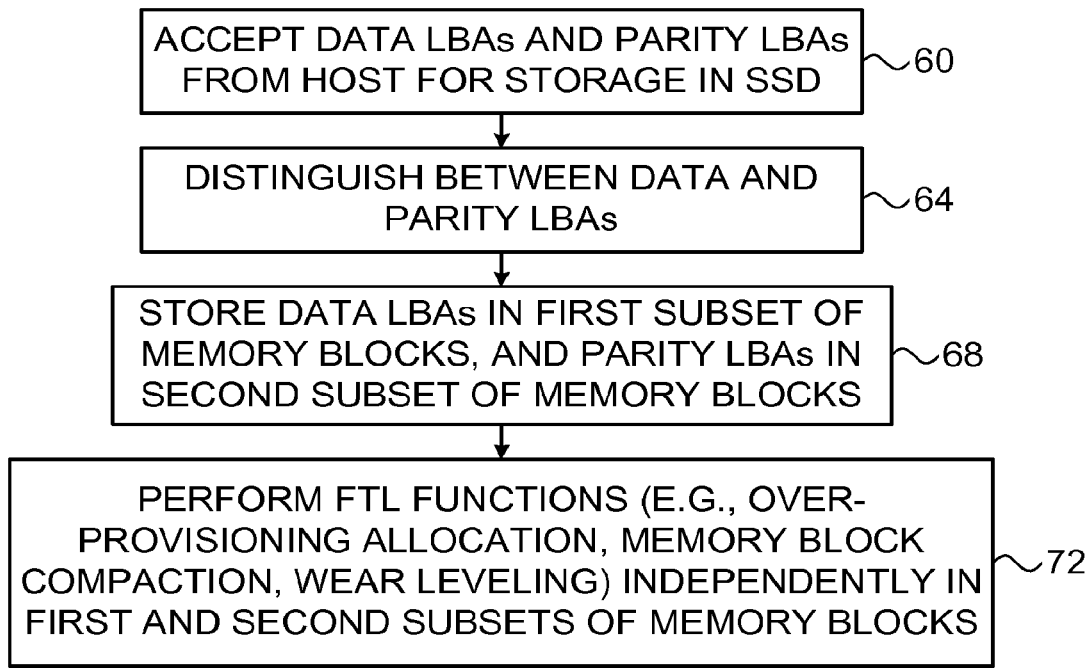
FIG. 2 is a flow chart that schematically illustrates a method for memory management, in accordance with an embodiment of the present invention.

FIG. 2 is a flow chart that schematically illustrates a method for memory management, in accordance with an embodiment of the present invention. The description that follows refers to LBAs, but the disclosed techniques can be applied in a similar manner in any other suitable addressing scheme.

The method begins with SSD controller 40 accepting data items containing application data and data items containing parity information, at an input step 60. Each data item is accepted from the host with a respective logical address. The data items containing application data and their respective logical addresses are referred to herein as data LBAs, and the data items containing parity information and their respective logical addresses are referred to herein as parity LBAs, for the sake of brevity.

SSD controller 40 identifies which of the accepted LBAs are data LBAs and which are parity LBAs, at an identification step 64. Several example techniques for distinguishing between data LBAs and parity LBAs are described further below.

The SSD controller stores the accepted LBAs in physical memory blocks 52 of memory devices 44, at a storage step 68. Based on the identification of step 64, the SSD controller stores the data LBAs in a first subset of blocks 52, and the parity LBAs in a second subset of blocks 52, different from the first subset. Storing the LBAs in this manner ensures that data LBAs and parity LBAs are not intermixed in the same block 52. In other words, any block 52 may contain either data LBAs or parity LBAs, but not both.

SSD controller 40 performs management functions (e.g., FTL functions) separately and independently in the first subset (i.e., on the physical blocks containing data LBAs) and in the second subset (i.e., on the physical blocks containing parity LBAs), at a management step 72.

Example Independent Memory Management Functions

In various embodiments, SSD controller 40 may perform various management functions independently in the first and second subsets of blocks 52. Some of these functions have to do with compaction and assignment of over-provisioning overhead. As explained above, data is written to memory devices 44 in page units, but erasure is applied to entire memory blocks 52. Data is written only to erased pages, and it is therefore not possible to update data in-place. Updating data involves writing the updated data to another physical storage location, marking the previous version of the data as invalid, and dynamically updating the mapping of logical addresses to physical storage locations.

Because of the above characteristics, memory blocks 52 gradually accumulate invalid data elements, whose updated versions have been stored in other physical storage locations. In order to reduce the number of invalid elements, SSD controller 40 carries out a compaction, or "garbage collection" process. This process selects one or more memory blocks 52 for compaction, copies the valid data from the selected memory blocks to other storage locations, and then erases the selected memory blocks. The erased blocks are then ready for subsequent programming.

The efficiency of the compaction process (which can be quantified, for example, by the average number of copy operations performed per block compaction) improves as a function of the over-provisioning ratio of the memory (the ratio between the true physical capacity of the memory and the specified capacity that is provided to external entities for storing data). Typically, the aggregated size of the memory areas that do not hold valid data ("holes") within blocks 52 is referred to as an over-provisioning overhead. The over-provisioning overhead can be specified as an over-provisioning ratio, which is defined as a fraction of the specified memory capacity. For example, when the memory uses an over-provisioning ratio of 5% and the memory is logically full, memory blocks 52 are only 95% programmed, on average.

When the memory is over-provisioned, garbage collection can be performed more efficiently. In other words, the number of copy operations per block compaction can be reduced. The efficiency of the garbage collection process increases as a function of the over-provisioning ratio used in the memory. Increasing the over-provisioning ratio reduces the number of copy operations required, and as a result reduces the wearing of memory cells. Increasing the over-provisioning ratio also increases the programming throughput. The effect of the over-provisioning overhead on cell wearing and storage throughput is particularly strong when the memory is full or nearly full.

In some embodiments, SSD controller 40 performs compaction of blocks 52 separately and independently on the blocks containing the data LBAs and on the blocks containing the parity LBAs. In other words, the SSD controller selects from the first subset one or more candidate blocks for compaction, and compacts them by copying valid data from the compacted blocks to other storage locations within the first subset. A similar process is performed within the second subset, irrespective of the first subset. The compaction processes conducted in the first and second subsets are independent of one another.

By separating the compaction of blocks containing data LBAs and blocks containing parity LBAs, the SSD controller reduces the number of unnecessary copy operations. As a result, the efficiency of the compaction process increases and the performance of SSD 32 improves.

In some embodiments, SSD controller 40 assigns different over-provisioning ratios for the first and second subsets of blocks 52. Typically, the SSD controller assigns a certain over-provisioning ratio in the subset of blocks containing the data LBAs, and a higher over-provisioning ratio in the subset of blocks containing the parity LBAs irrespective of the other subset.

Since parity LBAs are written more frequently than data LBAs, assigning a high over-provisioning ratio to the blocks containing the parity LBAs causes a significant improvement in write performance. On the other hand, since the number of parity LBAs is usually considerably smaller than the number of data LBAs, assigning a high over-provisioning ratio to the blocks containing the parity LBAs causes only little reduction in the available memory space.

In some embodiments, SSD controller 40 carries out static wear leveling separately and independently within the first and second subsets of blocks 52. In a typical static wear leveling process, the SSD controller selects from time to time static blocks (blocks whose data is not updated for a long period of time) and copies their data to other blocks (in order to use the available endurance of the static block).

In some embodiments, SSD controller 40 runs independent static wear leveling processes in the blocks containing the data LBAs and in the blocks containing the parity LBAs. In an example embodiment, in each static wear leveling operation, the SSD controller selects one block from the first subset and one block from the second subset, and applies static wear leveling to the selected blocks.

Further alternatively, SSD controller may perform any other suitable management function independently in the blocks containing the data LBAs and in the blocks containing the parity LBAs.

Identification of Parity LBA'S

In various embodiments, SSD controller 40 may identify the parity LBAs (i.e., distinguish between data LBAs and parity LBAs) in various ways. Several example techniques that can be used for this purpose are described below. These techniques can be used, for example, to implement step 64 of the method of FIG. 2. Some of the techniques involve cooperation of host processor 24, and others do not assume any cooperation on the part of the host processor.

In some embodiments, the command interface between host processor 24 and SSD controller 40 comprises one or more commands, using which the host processor indicates to the SSD controller one or more parameters of the redundant storage scheme. The parameters assist the SSD controller in identifying the parity LBAs.

For example, when the host processor produces the parity LBAs in accordance with a RAID scheme that is applied among multiple SSDs, the host processor may indicate the following parameters to each SSD controller:
  Disk partition.
  The RAID type (e.g., RAID 5 or RAID 6) per partition
  The size of the RAID group (per partition).
  The offset of the specific SSD in the RAID group (per partition).
  The minimal group of LBAs that are written together.
  Parity de-clustering information, if used (per partition).

Alternatively, the SSD controller may receive any other suitable parameters indicative of the redundant storage scheme used for producing the parity LBAs. The SSD controller uses the received parameters to identify which of the received LBAs comprise parity LBAs and which comprise data LBAs. The host processor may send the parameters to the SSD controller, for example, over the same interface it uses for sending the data items, over a separate sideband interface, or implicitly by pre-coordinating logical address ranges for the application data and the parity information that are known both to the host processor and to the SSD controller.

In an alternative embodiment, the SSD controller may receive the parameters of the redundant storage scheme from another source, not necessarily from the host processor. The parameters may be received in the SSD controller via the host processor, e.g., using a tunneling protocol. Alternatively, the SSD controller may receive the parameters via one or more separate ports other than host interface 36, e.g., debug ports.

In alternative embodiments, information regarding the redundant storage scheme is stored in a certain data structure on SSD 32 itself, e.g., by the host processor. In some embodiments, SSD controller 40 is aware of the location and structure of this data structure. In these embodiments, the SSD controller extracts the information regarding the redundant storage scheme from the data structure, and uses this information for identifying the parity LBAs.

Alternatively to interpreting the redundant storage scheme internally from the extracted information, the SSD controller may send the extracted information to an external agent (e.g., via an additional port) for interpretation, and receive an interpretation of the redundant storage scheme from the external agent.

In some embodiments, SSD controller 40 identifies the parity LBAs by analyzing the statistical distribution of the logical addresses (LBAs in the present example) of the memory access commands sent from host processor 24 to SSD 32, and in particular write commands. As explained above, the parity LBAs are written at a higher frequency relative to the data LBAs. Moreover, for a certain redundant storage scheme, the relationship between the write frequency of parity LBAs and the write frequency of data LBAs is known. The SSD controller may use this information to identify which LBAs received from host processor 24 comprise parity LBAs.

In the present example, host processor 24 applies a RAID 5 scheme among N SSDs 32. The example scheme has no parity de-clustering, i.e., meaning that the parity offset in the stripe is repeated every stripe length. An individual SSD controller 40, however, is typically unaware of the number of LBAs per RAID group or of its offset (O) within the RAID group.

In an example embodiment, SSD controller 40 carries out a phased process. The process begins with an acquisition phase in which the SSD controller deduces the size of the RAID group and its own offset within the group from the statistical distribution of the logical addresses (e.g., LBAs) written to this SSD. Then the SSD controller carries out a tracking phase, which continually verifies that the written LBAs indeed follow the deduced parameters of the RAID scheme.

Figure 3:
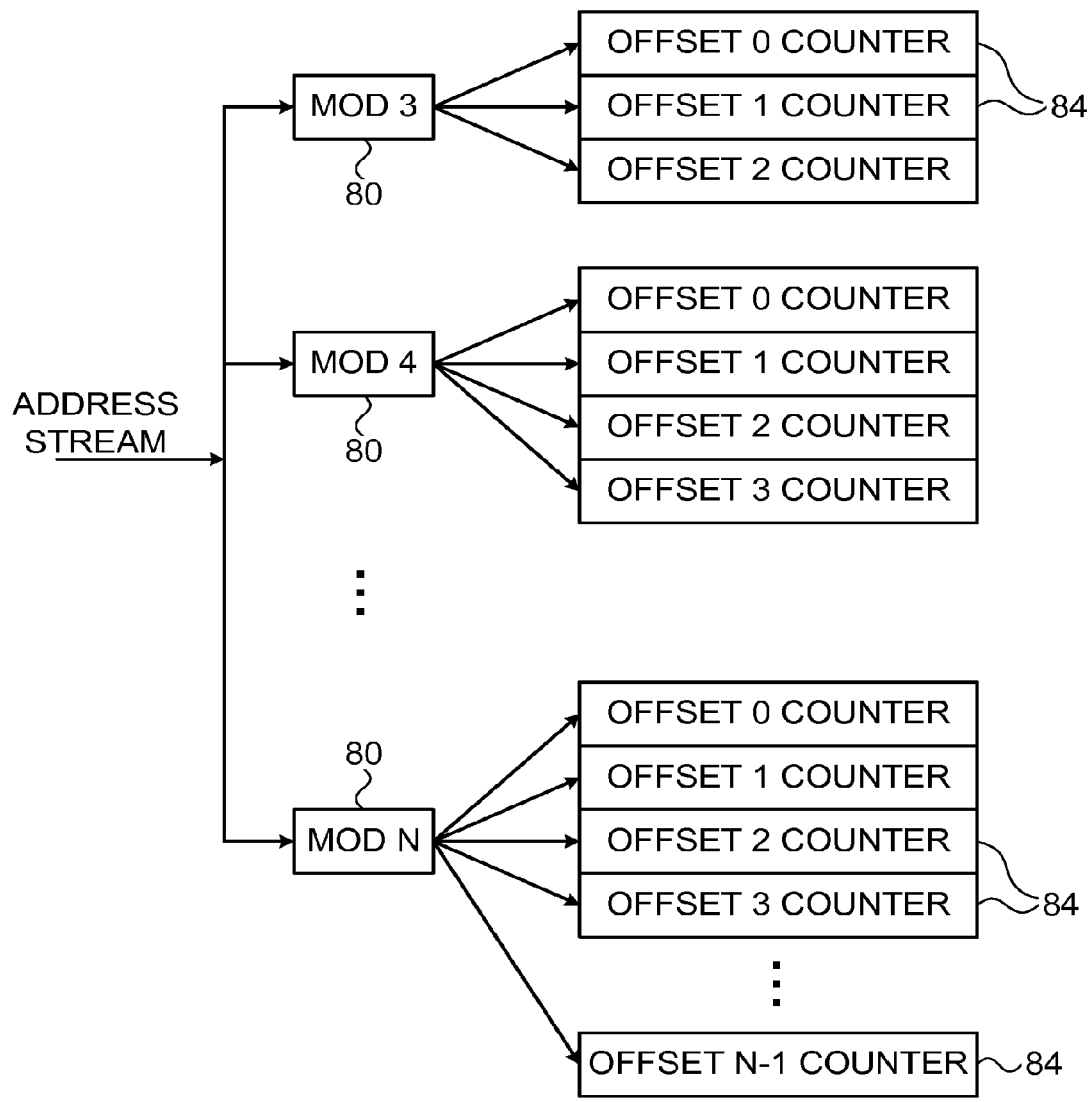
FIG. 3 is a diagram that schematically illustrates a process of identifying parity Logical Block Addresses (LBAs), in accordance with an embodiment of the present invention.

FIG. 3 is a diagram that schematically illustrates the acquisition phase of identifying parity LBAs, in accordance with an embodiment of the present invention. In this process, SSD controller 40 maintains multiple modulo units 80 that calculate the modulo k of the incoming logical addresses, i.e., the remainder of the division of each logical address by k (k=3 . . . N). The output of each modulo unit 80 is provided to a respective set of offset counters 84. The output of the mod k unit is provided to k offset counters, which respectively count the number of modulo results 0 . . . k−1 produced by the mod k unit. The modulo units and the offset counters may be implemented in hardware, software or both.

As explained above, in a RAID 5 scheme 50% of the write commands are written to the parity LBAs, and the remaining 50% are written to the data LBAs. In this embodiment, the SSD controller attempts to find a RAID group size and offset that meet this condition.

For each set of offset counters (the counters associated with a certain modulo unit), the SSD controller selects the offset counter having the highest value. The SSD controller compares the value of this counter to the sum of all the other counter values in the same set. The SSD controller identifies the set of counters for which the highest counter value is approximately equal to the sum of the other counter values in the set.

If such a set is identified, the k of the modulo unit of the identified set is the size of the RAID group, and the index of the counter having the highest value in the set is the offset O of the particular SSD. Having found the RAID scheme parameters, the SSD controller is now able to identify the parity LBAs.

After initially identifying the RAID scheme parameters in the acquisition phase, SSD controller 40 carries out a tracking phase that verifies whether the incoming stream of LBAs adheres to these parameters. In an example embodiment, the SSD controller calculates the modulo of the incoming LBAs divided by the detected RAID group size. The SSD controller maintains two counters—One counter is incremented when the modulo result is the identified offset O, and the other is incremented when the modulo result differs from the identified offset O. If the values of the two counters are approximately equal, the SSD controller assumes that the RAID parameters are correct. Otherwise, the RAID parameters are regarded as wrong. In such a case, the SSD controller may perform acquisition again, or take any other corrective action.

The example above refers to RAID 5 with no parity de-clustering, for the sake of clarity. In alternative embodiments, SSD controller 40 may use a similar technique to deduce parameters of other RAID schemes (e.g., RAID 6) from the statistical distribution of the incoming LBAs.

In some embodiments, the host processor uses parity de-clustering, i.e., distributes the parity LBAs among the SSDs according to some de-clustering rule. When the de-clustering rule is known to SSD controller 40, the SSD controller can modify the acquisition and tracking processes to take the de-clustering rule into account. When the de-clustering rule is not known to SSD controller 40, the acquisition phase can be modified to include an initial phase of deducing the de-clustering rule. In one embodiment, this initial phase can be implemented as an additional tree structure preceding the scheme of FIG. 3. The tree structure would comprise a respective branch for each de-clustering rule option.

As explained above, SSD controller maintains a logical-to-physical address mapping table, which gives the physical storage location corresponding to each LBA. In some embodiments, after SSD controller identified that a certain LBA is a parity LBA, the SSD controller marks this fact in the logical-to-physical address mapping table for future use. This technique enables the SSD controller to distinguish between parity LBAs and data LBAs in future memory access operations quickly and easily.

Independent Memory Management for Data and Parity LBA'S for Redundant Storage Scheme Applied by Host The embodiments described above refer mainly to redundant storage schemes that are applied among multiple SSDs by the host. In alternative embodiments, SSD controller 40 (or other memory controller) applies a redundant storage scheme internally to SSD 32. The SSD controller typically accepts the application data from the host and calculates the parity information over the application data. The internal redundant storage scheme (e.g., RAID) may be applied, for example, among multiple Flash devices, dies or groups of dies within a given SSD.

In these embodiments, the SSD controller stores the application data and the parity information in separate memory areas in memory devices 44 (e.g., in separate sets of memory blocks), and performs memory management tasks independently in each of these areas. The separate storage and memory management of application data and the parity information may be carried out by the SSD controller in any suitable way, such as using any of the methods described above with respect to host-implemented redundant storage.

In some embodiments, host processor 24 applies a certain redundant storage scheme (referred to as an external redundant storage scheme), and SSD controller 40 applies a separate redundant storage scheme (referred to as an external redundant storage scheme). The combination of the two redundant storage schemes produces four different types of data items:

Data items containing application data.

Data items containing external parity information calculated by the host processor.

Data items containing internal parity information that is calculated by the SSD controller over the application data.

Data items containing internal parity information that is calculated by the SSD controller over the external parity information.

Each of the four data items typically has access statistics that differ from the other types. In some embodiments, SSD controller 40 distinguishes between the four types of data items, stores each type of data items in a separate memory area of memory devices 44, and carries out memory management tasks (e.g., over-provisioning, garbage collection or static wear-leveling) independently in each memory area.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

What is claimed is:

1. An apparatus, comprising:
an interface configured to receive at least application data for storage in a memory; and
a processor configured to:
identify, in a set of data items associated with respective logical addresses for storage in the memory, a first subset of the logical addresses associated with the data items that include the application data dependent upon one or more parameters;
identify a second subset of the logical addresses with the data items containing parity information that has been calculated over the application data dependent upon the one or more parameters;
store data items associated with the first subset in first physical areas of the memory;
store data items associated with the second identified subset in second physical memory areas of the memory, wherein the second physical areas of the memory are different from the first physical areas of the memory;

extract the one or more parameters from at least one data structure stored in the memory; and perform a memory management task independently in the first physical areas of the memory and in the second physical areas of the memory.

2. The apparatus of claim 1, wherein the interface is further configured to:

accept the set of data items and the respective logical addresses from a host; and provide the data items and the respective logical addresses to the processor.

3. The apparatus of claim 1, wherein the processor is further configured to assign a first over-provisioning overhead to the first physical areas of memory, and assign a second over-provisioning overhead to the second physical areas of memory, wherein the second over-provisioning overhead is different from the first over-provisioning overhead.

4. The apparatus of claim 1, wherein to perform the memory management task, the processor is further configured to perform compaction in the first physical areas of the memory, and to perform compaction in the second physical areas of the memory independent of an operation performed in the first physical areas of the memory.

5. The apparatus of claim 1, wherein to perform the memory management task, the processor is further configured to perform static wear leveling in the first physical areas of the memory, and perform static wear leveling in the second physical areas of the memory independent an operation performed in the first physical areas of the memory.

6. The apparatus of claim 1, wherein the one or more parameters include one or more parameters of a redundant storage scheme.

7. A method, comprising:

receiving, by a controller, a plurality of data items and a respective plurality of logical addresses, wherein the plurality of data items includes a plurality of application data items and a plurality of parity data items;

identifying, by the controller, a first subset of the plurality of logical addresses and a second subset of the plurality of logical addresses dependent upon one or more parameters, wherein each logical address of the first subset of the plurality of logical addresses corresponds to a respective application data items of the plurality of application data items, and wherein each logical address of the second subset of the plurality of logical addresses corresponds to a respective parity data item of the plurality of parity data items;

storing, by the controller, each application data item of the plurality of application data items in a first portion of a memory dependent upon the first subset of the plurality of logical addresses;

extracting the one or more parameters from at least one data structure stored in the memory; and storing, by the controller, each parity data item of the plurality of data items in a second portion of the memory dependent upon the second subset of the plurality of logical addresses.

8. The method of claim 7, further comprising receiving, by the controller, at least one command, wherein the at least one command includes the one or more parameters.

9. The method of claim 7, wherein receiving, by the controller, the plurality of data items and the respective plurality of logical addresses, comprises receiving, by the controller, via a first interface, the plurality of data items and the respective plurality of logical addresses, and further comprising receiving, by the controller, via a second interface, the one or more parameters.

10. The method of claim 7, wherein identifying, by the controller, the first subset of the plurality of logical addresses and the second subset of the plurality of logical addresses dependent upon one or more parameters comprises analyzing a distribution of the plurality of logical addresses.

11. The method of claim 7, wherein the one or more parameters are dependent upon a frequency of write commands.

12. The method of claim 7, further comprising sending the extracted one or more parameters to an external agent.

13. An apparatus, comprising:

a memory; and a processor configured to:

receive a plurality of data items and a respective plurality of logical addresses, wherein the plurality of data items includes a plurality of application data items and a plurality of parity data items;

identify a first subset of the plurality of logical addresses and a second subset of the plurality of logical addresses dependent upon one or more parameters, wherein each logical address of the first subset of the plurality of logical addresses corresponds to a respective application data items of the plurality of application data items, and wherein each logical address of the second subset of the plurality of logical addresses corresponds to a respective parity data item of the plurality of parity data items;

store each application data item of the plurality of application data items in a first portion of the memory dependent upon the first subset of the plurality of logical addresses;

extract the one or more parameters from at least one data structure stored in the memory; and store each parity data item of the plurality of data items in a second portion of the memory dependent upon the second subset of the plurality of logical addresses.

14. The apparatus of claim 13, wherein the processor is further configured to receive at least one command, wherein the at least one command includes the one or more parameters.

15. The apparatus of claim 13, wherein to receive the plurality of data items and the respective plurality of logical addresses, the processor is further configured to receive the plurality of data items and the respective plurality of logical addresses via a first interface, and wherein the processor is further configured to receive the one or more parameters via a second interface.

16. The apparatus of claim 13, wherein to identify the first subset of the plurality of logical addresses and the second subset of the plurality of logical addresses dependent upon one or more parameters the processor is further configured to analyzing a distribution of the plurality of logical addresses.

17. The apparatus of claim 13, wherein the one or more parameters are dependent upon a frequency of write commands.

18. The apparatus of claim 13, wherein the processor is further configured to send the extracted one or more parameters to an external agent.

* * * * *